United States Patent [19]

Allada

[11] 4,155,965
[45] May 22, 1979

[54] CONTINUOUS SUBMERGED FOAMING OF THERMOPLASTIC RESIN

[75] Inventor: Sambasiva R. Allada, Midland, Mich.

[73] Assignee: The Dow Chemical Company, Midland, Mich.

[21] Appl. No.: 757,703

[22] Filed: Jan. 7, 1977

[51] Int. Cl.$^2$ .................. B29D 27/00; F28D 11/02; F28F 23/02

[52] U.S. Cl. .................. 264/22; 264/45.9; 264/53; 264/54; 264/236; 264/347; 264/DIG. 9; 264/DIG. 18; 425/4 C; 425/817 C; 432/8; 432/59; 432/197; 432/210

[58] Field of Search .................. 264/54, DIG. 18, 88, 264/89, 236, 347, 234, 235, 345, 344, 346, DIG. 5, 180, 22, 45.9, 53, DIG. 9; 432/8, 11, 13, 59, 197, 210, 219, 220, 222; 425/4 C, 817 C

[56] References Cited

U.S. PATENT DOCUMENTS

| | | | |
|---|---|---|---|
| 1,528,537 | 3/1925 | Draemann | 425/71 X |
| 2,037,704 | 4/1936 | Carver | 264/344 |
| 2,139,414 | 12/1938 | Lee | 264/88 |
| 2,200,735 | 5/1940 | Battin | 425/71 |
| 2,581,559 | 1/1952 | Ryan | 264/180 |
| 2,827,661 | 3/1958 | Von Kohorn | 264/49 X |
| 2,838,800 | 6/1958 | Hertz | 264/88 X |
| 2,962,766 | 12/1960 | Hinkle et al. | 264/180 |
| 2,971,221 | 2/1961 | Schoenbeck | 264/347 |
| 2,988,777 | 6/1961 | Bieber et al. | 264/180 |
| 3,050,775 | 8/1962 | Levison et al. | 264/180 |
| 3,051,992 | 9/1962 | Bradley | 264/347 X |
| 3,060,501 | 10/1962 | Beal | 264/180 X |
| 3,562,367 | 2/1971 | Shinohara et al. | 264/54 X |
| 3,812,225 | 5/1974 | Hosoda et al. | 264/88 X |
| 3,862,285 | 1/1975 | North et al. | 264/180 X |
| 3,864,444 | 2/1975 | Johnson | 264/234 X |
| 3,954,929 | 5/1976 | Hoenke | 264/88 X |
| 4,069,286 | 1/1978 | Greenhalgh | 432/8 X |

FOREIGN PATENT DOCUMENTS

| | | | |
|---|---|---|---|
| 50-12160 | 2/1975 | Japan | 264/54 |
| 1331041 | 9/1973 | United Kingdom | 264/DIG. 18 |

*Primary Examiner*—Philip Anderson
*Attorney, Agent, or Firm*—Lester J. Dankert; Thomas R. Wills

[57] ABSTRACT

Continuous method and apparatus for treatment of a solid material submerged in a body of liquid wherein the material is sticky and/or has weak tensile strength. The material is supported, while it is so submerged, by a dynamic layer of the liquid lying between the material and a moving surface. The method is illustrated by heating and thereby foaming a strip of heat foamable thermoplastic resin while it is held submerged in a denser heat transfer liquid by a dynamic layer of that liquid generated by a moving belt above the foaming material. In an example, expandable high density polyethylene strip is foamed continuously while it is so held submerged in molten salt.

10 Claims, 6 Drawing Figures

CONTINUOUS SUBMERGED FOAMING OF THERMOPLASTIC RESIN

BACKGROUND OF THE INVENTION

It is known to produce thermoplastic resin foam in sheet form by compounding such a resin, e.g., polyethylene, with a thermally-decomposable blowing agent, e.g., azodicarbonamide, heat-plastifying the composition under conditions not causing decomposition of the blowing agent and fabricating therefrom a non-cellular sheet, crosslinking that sheet, e.g., by high energy electron irradiation, to obtain a crosslinked foamable sheet, and heating that crosslinked sheet to effect decomposition of the blowing agent and formation of gas-filled predominately closed cells in a resulting foamed resin sheet product. However, it is difficult to heat the crosslinked sheet product uniformly throughout to obtain uniform foaming, particularly in a continuous manner. Moreover, the foaming sheet is expanding in all directions while the resin is in heat-softened condition; in that stage the sheet would sag and distort under its own weight and must be supported in some way even though it is sticky and is expanding.

It has been suggested to foam foamable resin, e.g. sheets thereof, by immersion in hot liquid, but suitable means have not been described to keep the foaming sheet submerged against the buoyancy forces of the liquid without causing sticking or distortion of the foam. For instance, rollers, including racks of multiple rollers, are not satisfactory whether free-turning or driven or differentially driven because they provide only discontinuous support which is either highly localized (as with small diameter rollers) or is widely spaced (as is necessary with larger diameter rollers) and allows bulging of the soft foam material between such rollers. Belt conveyors in contact with the foam sheet are disadvantageous because the soft resin sticks thereto and the free expansion of the foam is impeded.

In U.S. Pat. No. 3,562,367 to Shinohara et al., there is described a float process of foaming foamable crosslinked olefinic resin sheet. In that process, such a sheet is heated in part and supported by floating it on the surface of a heavier liquid that is maintained at a temperature suitable for effecting the foaming, and the sheet is concurrently also heated from above with heat rays. A suitable such heat transfer liquid is a molten mixture of low melting salts, such as a mixture comprising potassium nitrate and sodium nitrite, which melts at a temperature below the foaming temperature of the foamable sheet and is used at a temperature that softens the sheet and decomposes the blowing agent. In such foaming step, the sheet is supported on the flat upper surface of the heat transfer liquid and is free to expand in all directions as the sheet foams while so supported. However, the heating of the foamable sheet to effect foaming thereof by heat transferred from the liquid beneath the sheet to the underneath side thereof must be exactly matched by heat transferred to the upper side of the sheet from heat ray sources above the sheet, e.g. infra-red lamps or like devices. Attaining such matching is particularly difficult in continuous operation where foamable sheet continuously moves across the surface of a heat transfer liquid bath, foams, and is continuously taken off and away as foamed sheet, wherein the temperature of the sheet changes during such transit and the temperature profiles of the sheet may also change during the operation. While these observations might suggest immersing the foamable sheet to allow the liquid heat transfer medium to uniformly heat the sheets by identical means from each side of the sheet simultaneously, suitable means to keep the sheet submerged have not heretofore been known, and the feature of supporting the sheet in a flat and unconfined condition on the liquid surface would thereby be lost. At column 3, lines 50 et seq. of printed copies of U.S. Pat. No. 3,562,367 it is stated that heating the foamable sheet in a heated liquid cannot be employed when producing foamed sheet, particularly continuously. Nevertheless, the non-uniform heating of floating sheet is at least troublesome. Moreover, sheets of some resins, such as radiation cross-linked linear polyethylene, which are susceptible to degradation and other deleterious effects of exposure to air at high temperatures, cannot consistently be foamed by the liquid bath surface float method without elaborate and inconvenient measures to maintain appropriately inert atmosphere over the liquid bath.

As to the handling problems caused by the stickiness and low tensile strength of the hot, foaming resin, similar problems are encountered in many other process operations where a soft solid is submerged in a treating liquid under conditions that the solid is sticky and/or has little tensile strength.

Accordingly, it would be desirable to provide improved method and means for carrying out such unit process with sticky and/or low tensile strength solid materials. Particularly, it would be desirable to provide method and means to effect foaming of a heat foamable material preform especially in the form of sheet comprising crosslinked thermoplastic resin and foaming agent such as thermally decomposable chemical blowing agent, which method and means would supply the necessary heat uniformly and simultaneously to all sides of the foamable and foaming material while protecting it from exposure to deleterious atmosphere, and would allow the foaming material to expand freely in all directions without distortions while carrying out the operations in continuous manner.

A general object of this invention is to provide improved method and means to fulfill the above desires.

A more specific object is to provide method and means to make thermoplastic resin foam, especially in sheet form, from foamable thermoplastic resin composition containing latent foaming agent such as thermally decomposable chemical foaming agent in continuous manner by continuously submerging the foamable material in a body of heat transfer liquid and conducting the material and resulting foaming product through such body of liquid and the resulting foamed product through and from such body of liquid.

Other objects and advantages of the invention will become evident in the description that follows.

BRIEF SUMMARY OF THE INVENTION

The objects of this invention are attained in method and means, more fully described hereinafter, illustrated by method and means wherein foamable resin material preform, e.g., in sheet form, is brought continuously into and submerged in a body of heat transfer liquid in a foamer wherein it is heated and caused to foam and the resulting foamed product is continuously removed from the liquid body. In one aspect, the invention is expressed as a method of submerged foaming wherein the improvement is particularly characterized. In another aspect, the invention is expressed as foamer apparatus particularly adapted to carry out the improved method. In general, the invention relates to method and apparatus means for transporting a soft solid material preform through a body of liquid for treatment thereby wherein the soft solid material preform is or becomes sticky or of weak tensile strength which makes the handling thereof difficult. Such difficult materials and processes are illustrated by the foaming of foamable thermoplastic resin composition preforms by submersion in hot liquids. In accordance with a specific aspect of the invention, the foaming and foamed product within the liquid body is held submerged therein by a dynamic layer of such liquid, the dynamic layer of liquid being advantageously maintained above the foaming and foamed product by the surface of moving wall means in the body of hot liquid heat transfer medium. In some embodiments, the dynamic layer of liquid is maintained by the moving wall means traveling above and in the same direction as that of the foaming and foamed product but at a substantially constant linear speed at least as fast as that of the foamed product. In other embodiments, the dynamic layer of liquid is maintained by the moving wall means traveling in direction opposite to that of the foaming and foamed product. In some embodiments, the traveling wall means is provided by a moving endless belt, which, during at least a portion of its circuit, is submerged in the heat transfer liquid body; the foamable material preform e.g. foamable sheet, is led into the body of liquid beneath the belt. The path taken by the preform through the body of heat transfer liquid is such that the point in time and place where foaming first occurs in the foamable material preform is not before the product reaches the lowest point on such path in vertical aspect, i.e., the point of deepest submersion of the preform in the liquid body. In general, the preform is guided through the liquid bath by the moving wall above the preform at least until the foaming thereof is substantially complete. However, the foaming and foamed product is not in actual contact with the moving wall means; by causing the wall means to travel in the opposite direction or in the same direction as the preform at a greater speed than that of the product, there is drawn in between the foaming resin preform and the moving wall means at least a thin but appreciable and significant liquid layer of the heat transfer liquid body. Thus, the foaming preform is surrounded by the heat transfer liquid on all sides and is subjected on all sides simultaneously to the heat input of the liquid bath heat transfer medium. Moreover, the preform is isolated from direct frictional contact with the solid submersion means while the preform is soft and sticky, whereby sticking is avoided, and the foaming resin preform is allowed to expand in all directions while being uniformly supported, so that distortion thereof, e.g., of foamed sheet, is prevented.

The practice of the present invention allows foaming of foamable resin sheet by uniform and rapid heating from both sides simultaneously while allowing expansion of the foam in all directions without sticking to solid surfaces or being distorted, and exposure of the hot resin foam to air oxidation is prevented by the body of heat transfer liquid. Further, the foaming step is advantageously carried out under pressure greater than atmospheric by the additional pressure exerted by the heat transfer liquid at the depth at which foaming of the resin preform takes place, such additional pressure being selected as desired and determined by the density of the selected liquid or molten material at the operating temperature and the depth of submersion of the resin material preform when foaming occurs.

The present submersion process is more stable in continuous operation than the float process. Once adjusted to operating conditions, it is less liable to become upset. It is also more flexible to allow wider selection of optimum operating conditions and can handle a wider variety of starting materials and products.

The resulting foam products are superior to those made from comparable materials by the float process because the present resulting foam products are more completely foamed and are more consistently uniform, smooth and regular, and free of surface blisters, scorched spots or areas of non-foaming or poor foaming. Also, production rates of foaming can be substantially faster with smaller equipment than with the float process since heating during foaming is entirely by liquid heat transfer means and higher temperatures can be used. Moreover, resin composition preforms which cannot be foamed by the float process, e.g. because they are susceptible to oxidation and degradation when exposed to air during foaming, are successfully foamed by the present process.

In preferred embodiments, the starting foamable resin preform is in the form of a sheet, e.g. a strip or web of indefinite length, which is continuously passed through the foaming step, foamed and collected as foamed sheet. Alternatively, the starting sheet is in form of short length pieces which individually or in succession are similarly passed through the foaming step, foamed and collected as foamed sheet pieces. By the term "sheet" as used herein is meant a form having at least one dimension (e.g. thickness) that is relatively small; although the other dimensions (e.g. width and length) can be relatively large (as in webs which have indefinitely long length), the width or both width and length can also be relatively small, e.g. in long tapes or strands of small width and thickness or the preform may be in the form of pieces (in the nature of bits or granules) having small length, width and thickness.

By "foamable" is meant that the starting material is capable of expanding by heat to form a product of larger volume and lower overall density, having cellular structure, usually substantially closed cells, in the resin matrix. Foamable starting materials include initially non-cellular materials and also include cellular materials that are capable of further expansion. Foamable starting materials also include composite structures such as laminates wherein the constituent components differ from each other in some respect, e.g., wherein at least one component is foamable and one or more other components is/are not foamable, such as a laminate sheet with foamable core and non-foamable skin layers, or multilayered foamable structures wherein the layers are foamable to foamed layers of different densities.

Although the invention is illustrated by application to the foaming of foamable resin composition preforms which are sticky and weak when in the hot foaming condition, it will be evident that the principles illustrated thereby are generally applicable. Thus, wherever a soft solid preform is submerged in a treating liquid under conditions that the solid preform is sticky and/or has little tensile strength, advantages accrue by carrying out the operations in accordance with the invention by supporting the soft, sticky and/or weak solid preform by a dynamic layer of liquid maintained in the manner described.

BRIEF DESCRIPTION OF THE DRAWING

The drawing sketches are not necessarily to scale, and conventional mechanical parts and structures of the apparatus are omitted for clarity.

DETAILED DESCRIPTION AND EMBODIMENTS

Heat-foamable resin compositions known in the prior art to be suitable for making foamed products by foaming in or on the surface of bodies of liquid heat transfer media are suitable for use in the present invention. Suitable polyolefin resin starting materials and chemical foaming agent starting materials, and means of fabricating therefrom foamable compositions and sheet forms thereof are disclosed in detail in U.S. Pat. No. 3,562,367 to Shinohara et al., which is hereby incorporated by reference and in its entirety into the present description. Other already known suitable foamable resin compositions contain styrenic polymer resins, e.g. copoly(styrene -acrylonitrile), polycarbonates, or other thermoplastic resins, and contain physical (as contrasted to chemically decomposable) foaming agents such as normally liquid agents that vaporize to form gas cells in the resin matrix at foaming temperature, e.g. hydrocarbons, fluorocarbons, chlorofluorocarbons and the like.

The essence of improvement in the present invention as applied to the foaming of such foamable resins resides in the concept of improved means to keep the foamable resin material preform submerged in a liquid heat transfer medium with particular attention to the resin material preform during its foaming stage when it is commonly sticky and expanding in all directions. The concept of the present invention so applied is to support the resin material preform, particularly in its foaming and freshly foamed condition, and to carry it through the body of heat transfer liquid while submerged therein, so as to limit the upward movement of the material preform through the liquid by buoyant forces, by providing above the material preform a dynamic layer of that same body of heat transfer liquid, such layer being maintained in desired position by a restraining wall means which is advantageously a moving wall which is traveling in the opposite direction to that of the foaming and foamed material preform or in the same direction at a substantially constant linear speed that is preferably faster than that of the foamed product. Thus, the foaming and foamed resin material preform is only indirectly guided by the moving wall means and, at least during the foaming and freshly expanded foam stage, the resin material preform is not in direct frictional contact with any solid surface; it is at all such times surrounded by the body of heat transfer liquid. The dynamic layer of liquid overlying the foaming and foamed material preform supports it in controlled manner against the buoyant forces and limits its upward movement in the body of liquid.

Figure 1A:
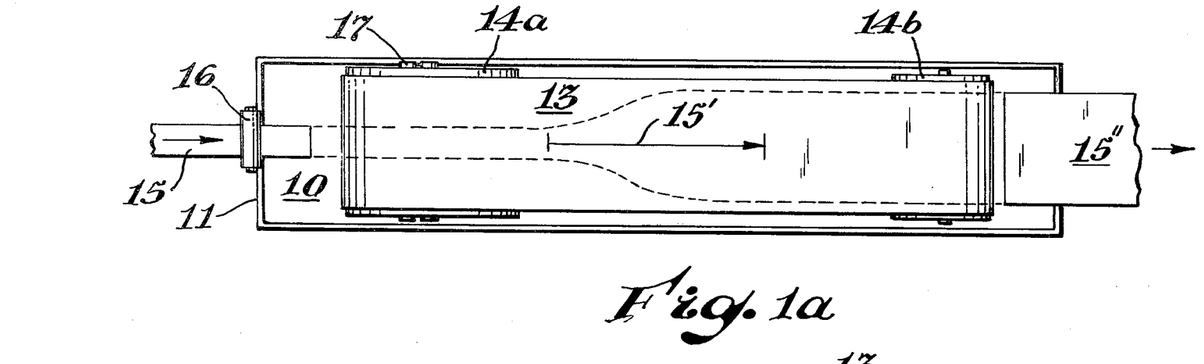
FIG. 1 of the drawing is a schematic sketch of one embodiment of method and apparatus means according to the invention.
Figure 1B:
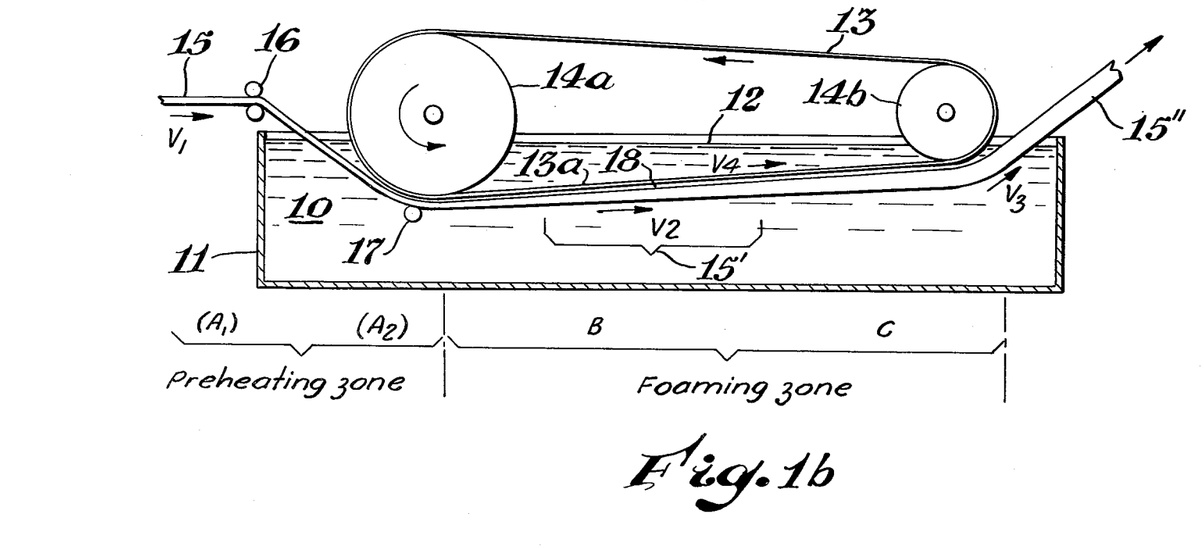

The invention can be visualized by reference to the drawings. FIG. 1 schematically illustrates one embodiment of suitable method and apparatus, FIG. 1a being in plan and FIG. 1b being a longitudinal vertical section of the foamer in elevation. A body of heat transfer liquid 10 is maintained in a suitable vessel 11, heated and circulated within the vessel by conventional means not shown, the body of liquid having an upper surface 12. An endless belt 13, passing over cylindrical drums 14a and 14b, is positioned so that at least a segment 13a of its length across the width thereof is submerged below the surface 12 of the liquid body 10. Drums 14a and b may be the same or different in diameter and at least one is driven by means not shown so as to drive belt 13. The axes of cylindrical drums 14a and b are substantially parallel to the surface 12 of liquid body 10.

A web 15 of foamable resin composition is taken from a source not shown through a constant speed control device such as rollers 16 and passed into the body of liquid beneath belt segment 13a where it foams to form foamed product 15" which is withdrawn from the liquid bath, cleaned and collected by means not shown. The incoming web 15 may be led to the belt 13 mechanism and stabilized in position proximate thereto by light pressure from roller 17. In the initial portion of the path through the body of liquid, the resin web is being heated by the liquid toward a temperature where the resin softens and the foaming agent is activated to form and/or expand gas cells therein. As the web reaches that temperature and foams, it expands in all directions, in thickness, width and length. If the expansion is isotropic, each dimension increases by a factor which is the cube root of the volume expansion. Thus, in the region depicted by 15' the foaming material is increasing in thickness, width and length. Because its volume is increasing, the upward thrust of the web by buoyancy forces is also increasing. Its natural tendency is to float toward the surface of the liquid medium, and this must be restrained, at least until foaming is substantially complete, in order to obtain the advantages of submersion foaming. Moreover, the expansion of the web means that adjacent surface elements thereof are moving apart both longitudinally and laterally of the web. Thus, in the region depicted by 15', the surface elements on both sides of the longitudinal center line of the web are moving away from that center line at velocity rates that accelerate as foaming proceeds vigorously, and are greater for surface elements nearer the edges of the web. The lateral velocity of movement away from the center line subsequently decreases as foaming nears completion. Such surface elements are also moving away from each other in a longitudinal direction in region 15'. Thus, within region 15' as depicted, surface elements of the web move laterally as well as accelerating in longitudinal velocity when the resin composition is foaming and is also most soft and sticky. As the expansion of the foaming material nears completion and in the resulting hot foamed product, the tensile strength of the material decreases because the cell walls of the resin matrix become thinner and the viscoelastic strength of the resin decreases as the foam temperature rises by heating from the surrounding liquid. Also, as the foam expands, the upward thrust caused by buoyancy forces increases. Accordingly, until the foamed product is taken from the foamer, it must be supported while being held submerged in the liquid even though the foaming and foamed product is soft and sticky.

In accordance with this invention, the web as depicted in FIG. 1, throughout the foaming zone, is restrained against its upward buoyant thrust by a dynamic layer 18 (FIG. 1b) of liquid which is a part of the body 10 of heat transfer liquid. Liquid layer 18 lies between the upward facing surface of web 15 and the downward facing surface of belt segment 13a.

In the embodiments illustrated in FIG. 1, dynamic layer 18 of liquid heat transfer medium is established and maintained by relative motion of the wall means belt 13 and the web 15 and 15'. As mentioned above, starting web 15 is fed at substantially constant linear longitudinal velocity, depicted as $V_1$. After foaming, the linear longitudinal velocity of the foamed web product 15'', which velocity is depicted as $V_3$, is greater than $V_1$ by a factor which is a function of the degree or extent of foaming and of longitudinal stretching and may be several times greater than $V_1$. In the active expanding region 15', the longitudinal linear velocity of the foaming web, depicted as $V_2$, increases from about $V_1$ to approach $V_3$. A preferred mode of operation to maintain the dynamic layer 18 of liquid is to cause the wall means, belt 13, to move in the same direction as the web submerged in the liquid body and to maintain the linear velocity of that belt, depicted as $V_4$, at least as great as $V_3$, preferably at least 1.5 times $V_3$, and more preferably greater than $V_3$ by a factor of several times, up to about eight times $V_3$. At relative speed $V_4:V_3$ less than one, e.g. $V_4 = V_1$, the liquid layer 18 becomes unstable or disappears, the foaming material makes frictional contact with the belt surface, and unsatisfactory results obtain. At higher relative speeds, e.g. $V_4:V_3$ appreciably greater than 1, and depending on the fluid flow properties of the heat transfer liquid and the viscoelastic properties of the resin in the web, the viscous drag of liquid layer 18 on the upper surface of the web tends to stretch the web formed. This may be desirable where longitudinal orientation of the foam or elongation of the cell structure is desired. At very high relative speeds, excessive shear stress tends to damage the foam, e.g. by tearing, stretching or breaking.

Still referring to FIG. 1, the web feed end of the operation and of the foamer comprises a preheating zone. Before entering the heat transfer liquid bath, the web 15 may be partially preheated, e.g. in Preheating Zone $A_1$ depicted in FIG. 1b, by conventional means not shown, e.g. by passing through a heated oven or between radiant heaters or the like. First immersion of the web in the heat transfer liquid also effects preheating, e.g. in Preheating Zone $A_2$. Throughout the preheating zone, it is essential that the temperature of the web not rise to the foaming temperature of the resin composition. Beyond the Preheating Zone, the web travels through the Foaming Zone as depicted in FIG. 1b, the operations being such that, at some time after entering the Foaming Zone, the temperature of the web rises to the foaming temperature of the resin composition, active foaming occurring in part B and being substantially completed in part C of that Zone, from which the resulting foam product is removed as product web 15''. The temperature of the liquid 10, taking into account its heat transfer properties, the velocity of incoming web 15, the treatment, if any, of web 15 in the Preheating Zone $A_1$, the maximum depth of immersion of web 15 in the liquid body, the path and thus residence time of web 15 in Preheating Zone $A_2$, and the path and residence time of the foaming web 15' in the Foaming Zone are inter-related, selected and adjusted so that foaming does not occur in the Preheating Zone and does occur and is completed in the Foaming Zone. As indicated in FIG. 1b, the path of the foaming and foamed web is upward in the foaming zone as the web moves forward toward the outgoing end. The depth at which the foaming web is maintained in the body of liquid is selected according to the pressure which is desired during the foaming step. Understandably, the greater the depth in the liquid (and greater the density of the liquid) the greater will be the hydrostatic pressure of liquid on the web. The angle to the horizontal at which the foaming web is maintained in the body of liquid is selected according to the buoyancy force and the tensile strength of the hot resin foam. The smaller the angle of the web with the horizontal, the greater is the normal vector of buoyancy force transmitted by the web to the dynamic layer of liquid 18, the more support is provided to weak foams, and the more constant is the liquid pressure on the web in that region. The greater that angle, the greater is the longitudinal tensile stress on the foam.

As mentioned, the conditions of operation are varied to vary the residence time of the web in the second stages or zones of the foamer. In some instances, conditions are selected so that expansion of the web commences soon after entering the Foaming Zone. In some such instances, expansion occurs rapidly so that region 15' is relatively short and Zone (C) is relatively long. In other instances, expansion occurs slowly so that region 15' is long and Zone (C) is short. In still other instances, conditions are selected so that expansion of the web does not commence until the web is further along into Zone (B). In some such instances, e.g. where the foamed product is susceptible to collapse if held too long at high temperature, Foaming Zone (C) is made relatively short so that the foamed product is removed from the foamer promptly after the expansion of the foam is substantially complete.

The apparatus and process schematically shown in FIG. 1 essentially comprise means for submerging a piece of material into a body of liquid wherein the material is in sticky and/or weak strength condition so as to make it difficult to handle such material while in such liquid, the present improvement being characterized by supporting such material in such liquid by a dynamic layer of the liquid. The apparatus and means of FIG. 1 are particularly adapted for materials which tend to float in liquids of greater density, such as the illustrated foaming resin materials. It will be obvious that, in the case of materials that tend to sink in liquids of lesser density, the supporting dynamic layer of liquid and the mechanism, e.g. moving belt, which generates such dynamic layer of liquid will be positioned beneath the solid material preform, e.g. strip, being processed. Many variations, e.g. of the means and apparatus of FIG. 1, will be obvious to the skilled mechanic.

Figure 2:
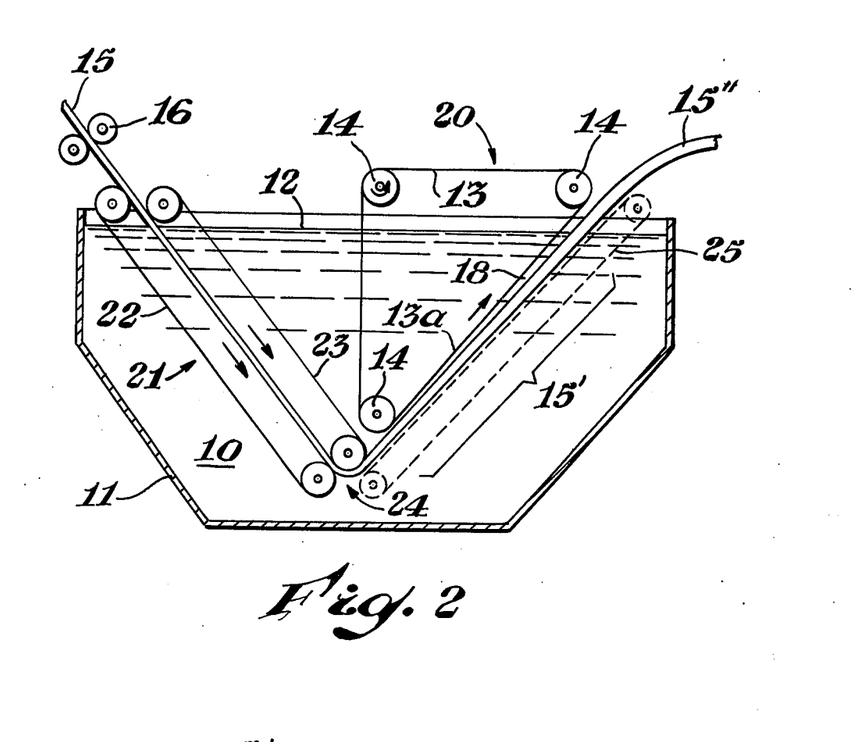
FIG. 2 is a schematic sketch of another such embodiment.

One such variation is shown schematically in FIG. 2 which is an elevation view of a longitudinal vertical section of a vessel 11 containing a body 10 of heat transfer liquid having a surface 12. A web 15 of foamable resin composition is fed from a source not shown through constant speed rollers 16 into the body of liquid, is heated therein to foaming, is foamed in region 15', and is removed as foamed web 15'' for further handling by means not shown. The sketch of FIG. 2 shows a means, generally depicted at 20, which maintains a dynamic layer 18 of the liquid on the upper side of the web in region 15'. That layer is maintained by a belt 13 passing over rollers 14 at least one of which is driven to drive belt 13 in the direction indicated by the arrow, belt segment 13a being substantially parallel to the web in region 15'. Rollers 14 are shown as three in number, but there could be more than three, or only two, if desired. Belt 13 is operated in the same manner and performs the same function as belt 13 in region 15' as shown in FIG. 1, i.e. keeps the foaming and foamed web submerged in the liquid without frictional contact of the web in its soft, sticky and expanding state with a solid surface. As shown in FIG. 2, the starting web 15 is carried through the heat transfer liquid and thereby preheated, prior to the foaming stage, by mechanism generally indicated at 21 which is operated separately but cooperatively with mechanism 20. In one form, 21 is a set of belts 22 and 23 driven in the direction indicated, e.g. over rollers by drive means not shown. In another form, 21 is a combination of one belt, e.g. 23, driven against a rack of parallel free-turning rollers, e.g. taking the place of belt 22. In another form, both belts 22 and 23 are replaced by racks of parallel rollers some of which are driven so as to carry the web toward the foaming zone. The vexing problems which are associated with the resin composition in the foaming zone because of its soft, sticky and expanding nature in that stage do not occur in the preheating step, so more latitude is allowable in selection of means for handling the web prior to foaming. Thus, belts 22 and 23 or their mechanical equivalent can be operated at linear speeds equal to that of the foamable web, and the belt surfaces can be in frictional contact with the web surface, if desired. Alternatively, the transport device 21 can be operated at linear velocity greater than that of the web, preferably without direct contact of the solid surfaces, with liquid surrounding the web. As mentioned in connection with FIG. 1, it is essential that the foamable material preform reach the point of deepest immersion in the liquid bath, e.g. point corresponding to location 24 in FIG. 2, before the temperature of the web reaches the foaming temperature and the resin composition of the web begins to foam.

In a modification of the foamer of FIG. 2, the belt 13 is caused to be driven in direction opposite to that shown in FIG. 2. Thus, dynamic layer 18 which supports the foaming and foamed web in region 15' is established and maintained by the movement of belt segment 13a in direction opposite to the movement of the web in region 15'. The speed of belt 13 in such opposite direction is selected to maintain the desired dynamic layer 18. An increase in such opposite belt speed tends to exert a counter drag on the velocity of the foam rising in the liquid because of buoyancy.

The sketch of FIG. 2 suggests means and method wherein the foamable portion of the web is carried relatively deeply into the body of heat transfer liquid, and the foaming and foamed portion of the web is maintained at a relatively large angle with the horizontal, compared with those of FIG. 1. Such modification is useful where the hot foam product is strong enough to withstand the tensile stress caused by the greater buoyancy effect of that larger angle.

The foamer of FIG. 2 is also adaptable to continuously handling discontinuous pieces of foamable starting material. The dual belt mechanism 21 provides positive means of feeding discontinuous pieces of foamable material into the foamer and conveying them to point 24. If desired, a driven belt mechanism 25 indicated in dotted lines is arranged beneath and generally parallel to the foaming and foamed material preform in region 15' to assist in conveying the material preform through the foaming zone and out of the foamer. Such belt mechanism 25 is also useful with continuous webs when both belt 13 and the belt on mechanism 25 are run in direction opposite to the movement of the foam web thereby counteracting the buoyancy force of the foam sheet rising in the dense liquid.

Figure 3:
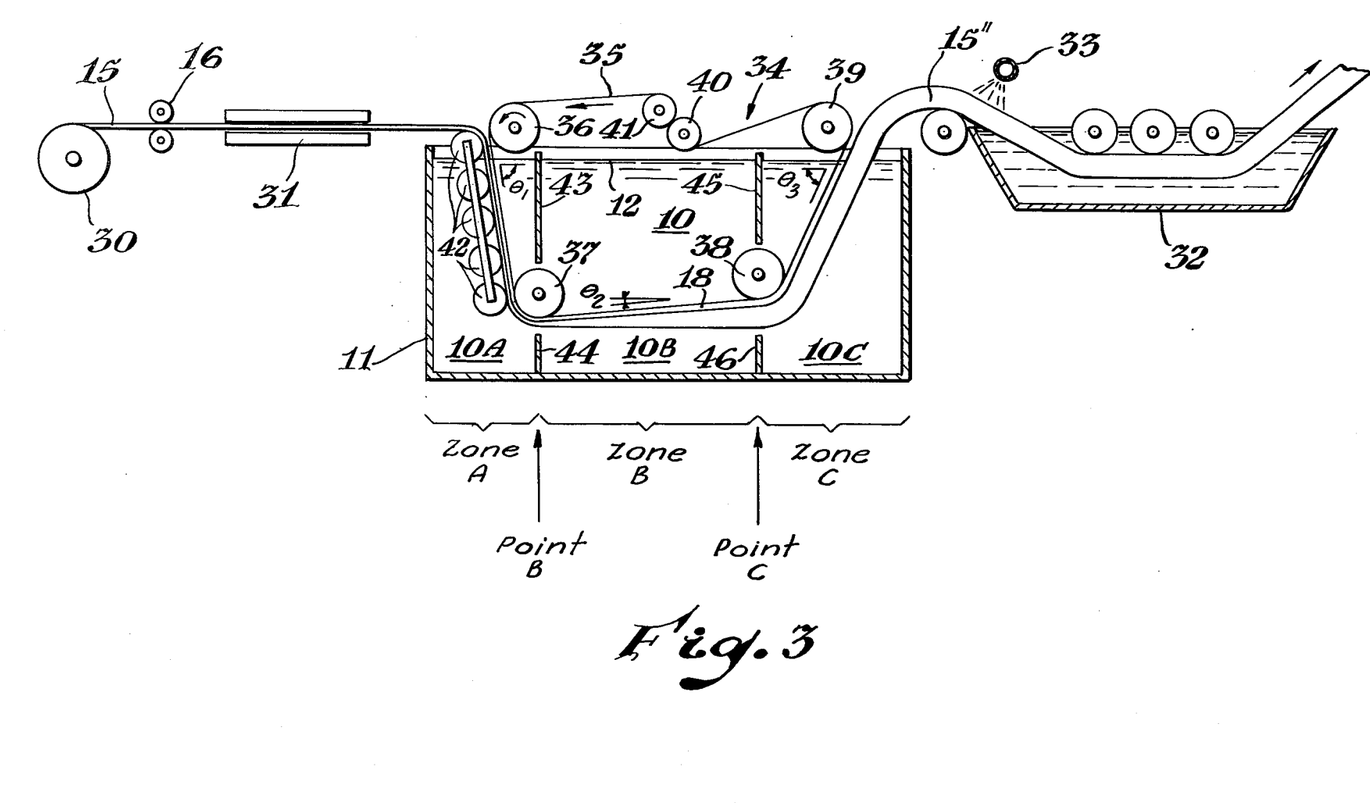
FIG. 3 is a schematic sketch of a further embodiment according to the invention.

Further variations are suggested by FIG. 3 which is an elevation view of a longitudinal vertical section of foamer apparatus having a belt in tetragonal configuration and including some of the associated devices. A web 15 of foamable resin composition is taken from a supply roll 30, passed through feed speed control rollers 16 and a preheater 31 and into a body of heat transfer liquid 10 in vessel 11 wherein the web is heated to foaming temperature and foamed. The resulting foam web 15" is withdrawn from the heat transfer liquid, appropriately cleansed, e.g. by washing in wash tank 32 having wash spray device 33, and collected for use or storage.

The apparatus comprises a belt mechanism generally indicated at 34 having a continuous belt 35 passing about a plurality of cylindrical rollers 36, 37, 38, 39, 40 and 41, at least one of which, e.g. roller 36, is driven by means not shown to drive the belt in the path and direction indicated. Rollers 40 and 41 are primarily designed to maintain belt tension as the relative positions of the other rollers are changed as described hereinafter. Rollers 36 and 37 and the belt segment therebetween cooperate with a rack of rollers 42 to conduct the incoming web of foamable material into the body of heat transfer liquid in a region indicated as Zone A. Zone A acts, together with preheater 31, to heat the foamable web toward, but not to, its foaming temperature. Point B represents the point of deepest immersion of the foamable web in the liquid, where the web enters Zone B. Within Zone B the temperature of the web usually reaches the foaming temperature and the web foams. Zone C represents that portion of the process where foaming is completed, or where foaming begins and is completed, and the web is removed from the heat transfer liquid.

As in the embodiments already described, belt 35 in FIG. 3 is caused to travel in a direction and at a linear speed sufficient to maintain a dynamic layer 18 of liquid 10 between the belt and the web and thereby supports the web in Zone B, where the web is foaming and expanding rapidly, and in Zone C where the hot foam is weak and has low tensile strength.

In the means illustrated in FIG. 3, the positions of the rollers, particularly rollers 37 and 38, are adjustable to vary the path taken by belt 35 and hence by the web being processed. Thus, the position of roller 37 and its relation to roller 36 affect the depth that the web is carried into the heat transfer liquid and the angle $\theta_1$ which the belt segment between the rollers and therefore the adjacent web segment have with the horizontal. $\theta_1$ can be any angle, preferably near 90°.

Roller 38 provides means to change the path of the web in Zones B and C prior to or after foaming thereof has begun. Rollers 37 and 38 and the belt segment therebetween can maintain the foaming web in Zone B at a different angle $\theta_2$ from that of the angle $\theta_3$ of the web in Zone C maintained by rollers 38 and 39 and the belt segment therebetween. By adjusting the position of roller 38 relative to 37, the angle $\theta_2$ of the belt and web with the horizontal can be changed as well as the distance between such rollers to affect the residence time of the web in the zone. Adjustment of the relative positions of rollers 38 and 39 similarly affects angle $\theta_3$ and the path and residence time of the web in Zone C. Usually, $\theta_2$ is relatively small, and $\theta_3$ is larger than $\theta_2$ but preferably less than 90°; when $\theta_2$ and $\theta_3$ approach equal values, the operation approaches the conditions of those indicated in FIGS. 1 and 2, i.e., in triangular belt configuration.

By operating so that $\theta_2$ is small, the initial stage of foaming the web in Zone B is carried out under substantially constant "hydrostatic" pressure that can advantageously be relatively large in deep liquid bath and/or in liquid of high density. Thereafter, in Zone C, at $\theta_3$ larger than $\theta_2$, the final foaming and resulting foamed product is conveyed from the high pressure condition of Zone B through smoothly reducing pressure to atmospheric pressure above the liquid body.

Moreover, FIG. 3 shows how the body of heat transfer liquid 10 can be zoned and maintained under significantly different conditions, e.g. of temperature, in Zones A, B and C. For this purpose, baffle plates 43, 44, 45 and 46 are fitted laterally across the vessel 11 and are adjustable in vertical aspect. Baffles 44 and 46 rise from the bottom of vessel 11 and baffles 43 and 45 reach downward from the surface 12 of liquid 10. Baffles 43 and 44 cooperate with roller 37 and/or with the web near point B to divide liquid body 10 into sub-portions 10A and 10B in Zones A and B, respectively. Similarly, baffles 45 and 46 cooperate with roller 38 and/or with the web near point C to practically separate the liquid body sub-portion 10B from sub-portion 10C in Zones B and C, respectively. When so partitioned, sub-portions 10A, 10B and 10C of the heat transfer liquid can advantageously be heated independently by heat means and circulation means not shown and maintained at different temperatures, if desired.

Thus, for example, using such baffles and independent liquid zones, the temperature of liquid sub-portion 10A is controlled at a value that is higher or lower than the temperature of liquid sub-portion 10B as is effective to preheat the web (at the selected linear travel speed thereof) to the desired temperature as the web passes Point B into Zone B. Liquid sub-portion 10B is independently controlled at a temperature optimum for foaming the particular composition of the web. Liquid sub-portion 10C is independently controlled at any desired temperature higher or lower than that of 10B. It will be obvious that the foamer can similarly be partitioned to provide more than three independently controlled zones, if desired.

Figure 4:
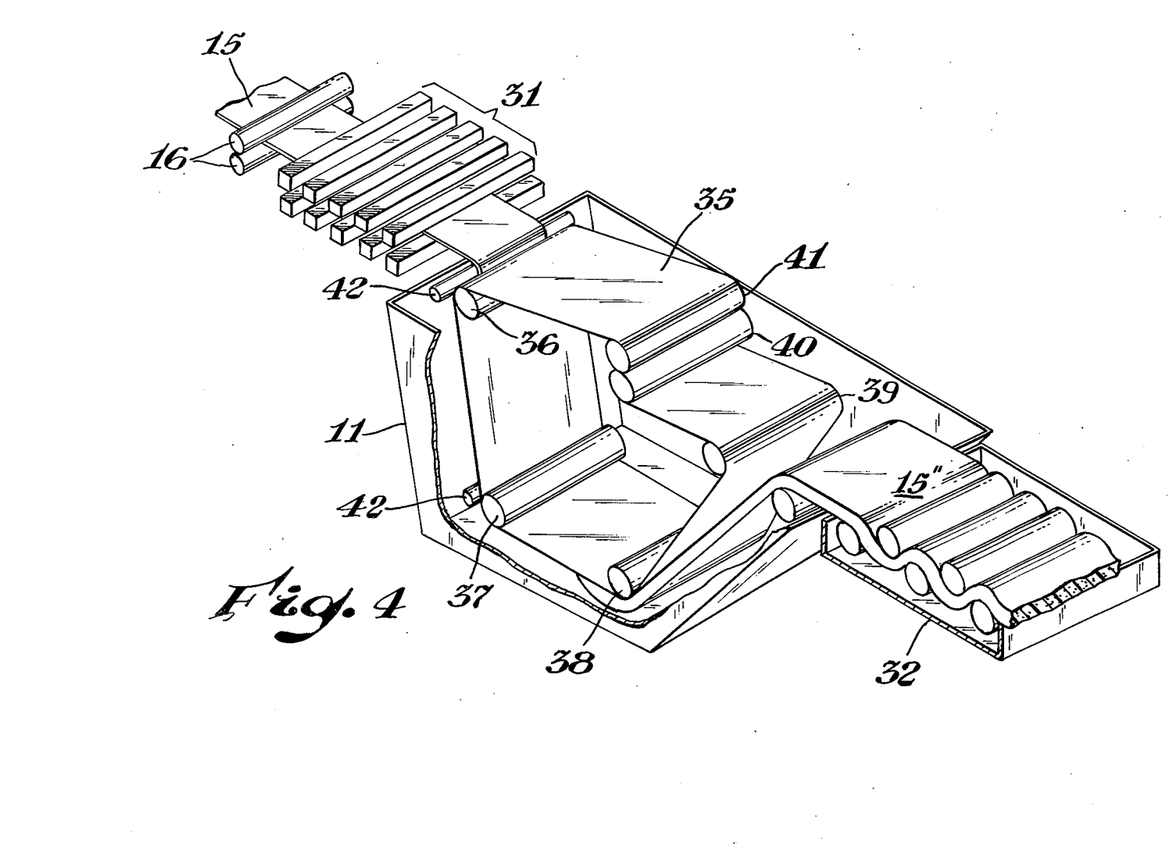
FIG. 4 is an isometric sketch of the principal elements of apparatus similar to the embodiment of FIG. 3.

FIG. 4 is an isometric view of the essential parts of a foamer similar to that schematically shown in FIG. 3 with parts similarly numbered. In FIG. 4, the vessel 11 is shown partially cut away, and the structural assembly, e.g. to support and drive the rollers and belt, is omitted for clarity. Also, FIG. 4 does not show baffle plates 43, 44, 45 and 46 shown in FIG. 3. In FIG. 4, preheater 31 comprises a plurality of electrical resistance elements, or steam or hot air tubes or like heating devices, powered and controlled by means not shown.

In some instances, because of viscosity or capillary or surface tension forces, the material web or strip being processed tends to follow or cling to the moving belt as they emerge from the body of liquid. In such case, it is advantageous to direct a stream of the liquid into the space between the belt and the strip or web product to effect their separation. Thus, referring to FIG. 1, a pipe, not shown, having nozzles, is placed at the surface 12 of the liquid body 10 and above the web product 15″ between web 15″ and belt 13 as it passes around drum 14b, the nozzle orifices being generally directed downward. Means are provided to pump a stream of liquid from body 10 through such pipe and nozzles downward toward web 15″ to cause the latter to separate from proximity to the belt as it rises from the liquid bath, whereby removal of the web product 15″ from the apparatus is facilitated. Similar such separating means (not shown) is provided in the apparatus of FIG. 2 (at upper right between web 15″ and belt 13 at surface 12) and in the apparatus of FIGS. 3 and 4 between web product 15″ and belt 35 as it passes to drum roller 39.

Figure 5:
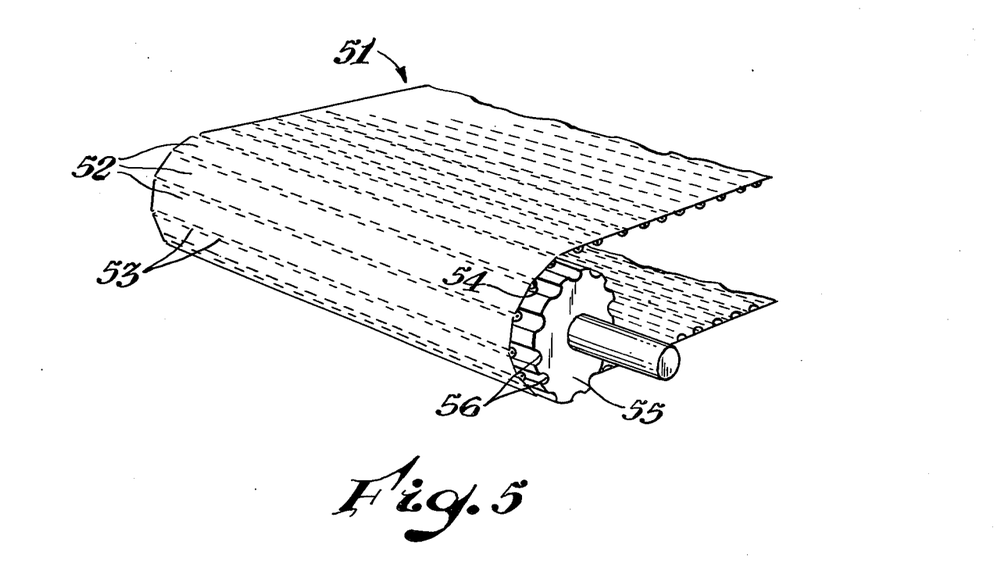
FIG. 5 is an isometric sketch of one form of hinged belt and grooved drive roller suitable for use in apparatus means of the invention.

The belts, e.g. 13 shown in FIGS. 1 and 2, 22, 23 and 25 in FIG. 2 and 35 shown in FIGS. 3 and 4 are flexible structures of any material that is inert under the operating temperatures to the liquid through which the belts travel in the apparatus. Thin sheet of metal such as steel is satisfactory and flexibility can be obtained or enhanced by articulation. A suitable such structure is shown in FIG. 5 where a belt 51 is constructed of a plurality of similar or complementary plate elements 52, adjacent such plates being hinged together along their edges by interdigitated integral knuckles 53 embracing a pin 54 transverse of the belt. FIG. 5 also shows a roller 55 that is suitable for driving such a belt. Roller 55 has grooves 56 longitudinal of the cylindrical surface of the roller and of a depth and spacing to accommodate the parallel hinge knuckles of belt 51. The design has the effect of chain and sprocket, whereby powered turning of roller 55 provides positive drive of belt 51.

When an articulated belt as shown in FIG. 5 is employed as belt 13 in the foamers of FIG. 1 and FIG. 2, or as belt 35 in foamers of FIG. 3 and FIG. 4, the belt is preferably disposed to have the knuckled side against supporting drums or rollers and thereby present a substantially flat surface toward the resin web, e.g. the foaming web in region 15′ of FIGS. 1 and 2 and Zones B and C of FIG. 3.

When an articulated belt having openings around the hinge elements or a sheet belt having holes or like openings therethrough is used, means can further be used in combination therewith to cause streams of liquid to flow through such openings from the side opposite the material preform being treated to the dynamic layer of liquid between the material preform and the belt. Thus, referring to FIG. 1, an array of nozzles (not shown) within the body of liquid 10 above the belt segment 13a is attached to pumping means to direct jets of liquid 10 through openings in belt 13 downward through such openings in belt segment 13a to augment the dynamic layer 18. Similar devices are optionally employed in apparatus variations such as those of FIGS. 2, 3 and 4 when the principal belts therein having openings allowing for passage of liquid. However, openings through the belt, e.g. belt 13 in the foamer of FIG. 1, are not required; a thin, flexible smooth surface metal foil belt, without holes, hinges or other openings, when operated in the manner described draws from the body of liquid 10 sufficient liquid along its surface facing the foaming resin web, e.g. 15′ in FIG. 1, to maintain the essential dynamic layer 18 of liquid.

The following specific examples illustrate the invention but are not to be taken as limiting its scope. Parts and percentages are by weight unless otherwise indicated or required by context.

EXAMPLE 1

A copolymer of ethylene and vinyl acetate (EVA) was used having 28% vinyl acetate and standard melt flow rate of about 3 dg/min. With 100 parts of the copolymer was admixed 16 parts of azodicarbonamide foaming agent. The mixture was heat plastified at minimum temperature to soften the resin without decomposing the azodicarbonamide and extruded into a lengthy strip 2.125 inches wide and 0.128 inch thick. The noncellular strip was then irradiated at room temperature with $\beta$-radiation (high energy electrons from Van de Graaff generator) to a dose of 3 megarads to effect partial crosslinking of the polymer structure of the EVA resin.

A submerged process foamer apparatus having the essential characteristic according to FIG. 1 was constructed with a thin (0.006 inch) stainless steel foil endless belt approximately 122 inches long by 7.75 inches wide running over two drums with their axes parallel to each other and about 48 inches apart and parallel to and about 2 inches above the surface of a body of heat transfer liquid. One drum was 10.75 inches diameter, driven by variable controlled speed power means and located near the input end of the foamer; the other drum was 6.5 inches diameter and located at the output end of the foamer. The belt mechanism was set to operate at a constant speed of 245 linear inches per minute.

The lower portion of each drum and the belt portion between such lower portions were below the surface of heat transfer liquid contained in an insulated vessel equipped with electric resistance heaters controlled by conventional temperature sensing, indicating and control means. The heat transfer liquid bath was composed of molten salt mixture of 53% potassium nitrate, 40% sodium nitrite and 7% sodium nitrate maintained at a temperature of approximately 253° C.

The partially crosslinked EVA foamable strip was fed into the heat transfer liquid under the first drum and the traveling belt and in the same direction as the belt but at a controlled speed of 27 linear inches of starting web strip per minute. Prior to entering the heat transfer liquid bath, the EVA strip passed through an air chamber and was preheated by steam heaters to temperature of about 123° C.

Submerged in the heat transfer liquid, the foamable EVA resin preform foamed and the resulting foamed sheet product remained submerged beneath the traveling belt until it passed beyond the second drum, whereupon the foamed sheet strip emerged from the molten salt bath. The so-formed foamed sheet was continuously washed with water, cooled and dried. The resulting cooled foamed sheet product was traveling at an average speed of 130 linear inches per minute and was 6.37 inches wide and 0.28 inch thick and had fine closed cell structure with density of approximately 2 pounds per cubic foot (pcf). The sheet was very uniform through its cross-section; its surfaces were alike and were smooth, flat, and with good texture and white color. There was no evidence either on the foamed sheet product or on the traveling steel belt that any sticking or direct frictional contact had occurred between the facing surfaces of the belt and the foaming or foamed resin sheet in the heating liquid bath.

EXAMPLE 2

In the foamer and in a manner like those described in Example 1, a chlorinated polyethylene (CPE) composition was foamed by continuous submerged foaming process. The CPE was based on linear polyethylene having standard Melt Index 6 dg/min. and contained 36% chlorine, and the composition was formulated as follows:

| | |
|---|---|
| CPE: | 100 parts |
| Epoxidized soy-bean oil (1) | 3 parts |
| Calcium stearate (2) | 2 parts |
| Azodicarbonamide (3) | 13 parts |

Notes:
(1) a thermal stabilizer for CPE
(2) a lubricant
(3) a chemical foaming agent The CPE formulation was heat plastified and extruded (without decomposing the azodicarbonamide) into a ribbon-like non-cellular web strip 2.19 inches wide and 0.118 inch thick. The web strip was irradiated at room temperature with 5.5 megarads of $\beta$-radiation from a Van de Graaff generator to effect partial crosslinking of the CPE resin. The resulting web strip was preheated to 124° C. and fed at constant speed of 28.5 linear inches per minute into the molten salt bath maintained at 224° C. The web strip was submerged in the molten salt beneath the steel foil belt running at 209 linear inches per minute. The submerged web strip foamed and the resulting foamed sheet product was continuously taken from the bath, washed with water, cooled and dried. The resulting foamed sheet was 7.4 inches wide, 0.3 inch thick, and had fine closed cell structure and density of 3.1 pcf. This foam sheet was of excellent quality and uniformity. Both major surfaces were smooth, flat and light color, and were alike in their superior appearance.

By way of contrast, when attempt was made to foam a portion of the starting crosslinked foamable CPE resin web by flotation process on the surface of molten salt with radiant heaters over the top side of the resin sheet, the results were unsatisfactory. It was not possible to obtain equal foaming behavior on the opposite sides of the resin sheet; the sheet tended to curl, the uppermost side tended to scorch, and uniformly foamed sheet of good quality was not obtained.

As in Example 1, there was no evidence in this example of submerged foaming of any sticking or direct frictional contact between the facing surfaces of the steel belt and the foaming or foamed CPE resin composition sheet.

EXAMPLE 3

In this example, the foamable resin sheet is composed of a copoly(styrene-acrylonitrile) resin composition prepared as beads by suspension copolymerization in aqueous medium at 80° C. for 7 hours followed by heating for 12 hours at 120° C. under autogenous pressure of a starting mixture of:

75 parts styrene
25 parts acrylonitrile
0.2 part benzoyl peroxide
0.1 part t-butyl perbenzoate
0.05 part divinylbenzene
20 parts 1,1,2-trichloro-1,2,2-trifluorethane. The peroxygen compounds are free-radical and polymerization initiators, the divinylbenzene is a cross-linking comonomer, and the trichloro-trifluoroethane is a latent foaming agent. The resulting crosslinked copolymer resin beads are molded under pressure into a non-cellular strip two inches wide and 0.1 inch thick.

The foamable strip is passed into a submerged process foamer described in Example 1, at linear speed of 40 inches per minute. Prior to entering the liquid bath, the strip passes through an air chamber where it is preheated to temperature in the range of 105° to 110° C. The mixed salt bath in the foamer is maintained at about 200° C. The resin strip passes beneath the endless steel foil belt running at approximately 200 inches per minute. The resulting foam is removed, washed, cooled and collected. The foam product is fine-celled and of excellent uniformity and quality, has density of 3.8 pcf, and the surfaces are smooth, flat and of good color. Again, there is no evidence of any sticking problem or frictional contact of the foaming or foamed resin strip to the belt in the foamer.

EXAMPLE 4

This example shows making a multilayered foam from low density polyethylene, density, 0.916 g/cc, Melt Index 5.5. A core composition was prepared having 7.5 parts finely powdered azodicarbonamide foaming agent per 100 parts of such polyethylene. A skin composition was similarly prepared with 5.0 parts of the azodicarbonamide per 100 parts of such polyethylene. The compositions were heat plastified and coextruded through a three-layer coextrusion die to form a non-cellular tape two inches wide having an inner layer of the core composition 1/16 inch thick and two outer layers of the skin composition, each 1/32 inch thick. The tape was irradiated at room temperature with high energy electrons in the manner described in Example 1 to a dose of 4 megarads to effect partial crosslinking of the polyethylene therein.

The resulting crosslinked, non-cellular foamable tape was foamed in continuous manner in the apparatus described in Example 1. The starting tape was fed at 26 linear inches per minute, preheated to 115° C., and passed into the molten salt bath maintained at 242° C. The endless belt was operated at constant speed of 245 linear inches per minute in the same direction as the tape being processed. The resulting foam strip was 4.9 inches wide and 0.174 inch thick, having average foam density about 4.2 pcf, fine, closed cell structure, excellent uniformity and appearance.

EXAMPLE 5

In this example, 100 parts of linear, high density (0.964 g/cc) polyethylene having Melt Index of 6 dg/min. was compounded with six parts of finely powdered azodicarbonamide blowing agent, heat plastified and extruded into a non-cellular, foamable strip 0.124 inch thick and 2.75 inches wide. The strip was irradiated at room temperature with high energy electrons in the manner described in Example 1 to a dose of 6 megarads to effect partial crosslinking of the polyethylene therein.

The resulting crosslinked, non-cellular foamable strip was foamed in continuous manner in the apparatus described in Example 1, except that the endless steel foil belt used therein was replaced with a hinged plate endless belt. This belt, designed as shown in FIG. 5, was 8 inches wide with narrow plates of carbon steel, 0.062 inch thick with integral interdigited hinges transverse of the belt, the knuckles of the hinges being on the underside of the belt, bearing against the roller drums, one of which served as a drive roll. The clearances around the hinge lines of the belt provided openings therethrough corresponding in aggregate area to about 3% of the one-side surface area of the belt (length times width).

The starting crosslinked, non-cellular foamable strip was fed at 26 linear inches per minute, preheated to 123° C., and passed into the molten salt bath maintained at 242° C. The endless hinged plate belt was operated at constant speed of 174 linear inches per minute in the same direction as the tape being processed. The resulting foam strip was 4.6 inches wide and 0.228 inch thick, having average foam density of 4.69 pcf, fine closed cells, smooth surface, excellent uniformity and appearance. In contrast, a piece of the same foamable crosslinked linear polyethylene strip, when heated by floating on the surface of the molten salt bath at the same temperature, foams unevenly, distorts and scorches, and the foam is non-uniform, wrinkled, discolored, more dense and of generally very poor quality.

In place of the molten mixed salt heat transfer liquid medium used in the foregoing examples there can be used other heat transfer liquids as hereinbefore described, especially ones which have normal boiling points appreciably higher than the operating foaming temperature and are stable and inert to the resin foam composition under such conditions. Such liquids include other low-melting salts and mixtures of salts, low-melting metals and alloys thereof, high boiling organic compounds such as stable glycols, polyglycols and glycol ethers, silicone oils and the like. Low-melting salt mixtures are advantageous because of their excellent heat transfer properties, ease of clean-up with water washing, and recovery for reuse.

What is claimed is:

1. In a continuous method of treating a solid material preform by submerging it into and passing it through and out of a body of liquid having a density different than that of the material preform, wherein the material preform is soft or has weak tensile strength and tends to stick to solid surfaces while so submerged in the liquid, the improvement which comprises supporting the material preform against forces resulting from said density differential, while so submerged and passing through the body of liquid, by causing at least a portion of an endless surface to travel within the body of liquid in a direction parallel to that of the material preform so that a dynamic layer of such liquid is generated and maintained between the material perform and the endless surface.

2. In a continuous method of forming foamed resin products wherein a heat foamable thermoplastic resin preform is passed into, submerged in, and passed through a body of heat transfer liquid that is at a temperature above the foaming temperature of the foamable thermoplastic resin preform whereby the foamable resin preform is heated by the heat transfer liquid to foaming temperature and foamed, and the resulting foamed resin product is removed from the body of heat transfer liquid, which liquid has greater density than the foaming and foamed resin product, the improvement wherein the foaming resin preform is held submerged while in the body of heat transfer liquid by causing at least a portion of a moving wall means to travel within the body of heat transfer liquid in a direction parallel to and in a position above the foaming resin preform to generate and maintain a dynamic layer of such liquid between the foaming resin preform and the moving wall means so that the foaming of said resin preform is substantially completed while said resin preform is beneath the moving wall means.

3. The improvement according to claim 2 wherein the moving wall means is caused to travel in the same direction as the foaming and foamed resin product and at a linear speed at least as fast as that of the foamed resin product through the body of heat transfer liquid.

4. The improvement according to claim 2 wherein the foamable thermoplastic resin preform is formed from a partially crosslinked olefin polymer resin composition with a foaming agent.

5. The improvement according to claim 2 wherein the foamable thermoplastic resin preform is formed from a linear polymer of ethylene, partially crosslinked by high energy radiation, containing a foaming agent.

6. The improvement according to claim 2 wherein the foamable thermoplastic resin preform is formed from a copolymer of ethylene and vinyl acetate, partially crosslinked by high energy radiation, containing a foaming agent.

7. The improvement according to claim 2 wherein the foamable thermoplastic resin preform is formed from a chlorinated polymer of ethylene, partially crosslinked by high energy radiation, containing a foaming agent.

8. The improvement according to claim 2 wherein the foamable thermoplastic resin preform is formed from a partially crosslinked polymer of styrene containing a foaming agent.

9. The improvement according to claim 3 wherein the foamable thermoplastic resin preform preform is in the form of a strip of indefinite length and the moving wall means is in the form of an endless belt, and said strip passes beneath said belt so that the point of deepest submersion of said strip into said body of heat transfer liquid is reached before the temperature of said strip reaches the foaming temperature of the foamable resin composition thereof and so that the resulting foaming of said strip is thereafter substantially completed while said strip is beneath said belt.

10. Apparatus for continuously forming foamed resin products from heat foamable thermoplastic resin preforms, which apparatus comprises a vessel adapted for holding a body of heat transfer liquid, means for controllably heating said liquid at a temperature above the heat foaming temperature of the foamable thermoplastic resin preform means for continuously passing the foamable resin preform into and submerging it in the body of heat transfer liquid, whereby the foamable resin preform is heated to its foaming temperature and foams, and means for continuously taking the resulting foamed resin product out of the body of heat transfer liquid, which liquid is more dense than the foaming and foamed resin product, which apparatus also comprises and is particularly characterized by moving wall means for generating and maintaining a dynamic layer of the heat transfer liquid to hold the foaming resin preform submerged while in the body of heat transfer liquid, said moving wall means being positioned above the path that would be taken by the foamable and foaming resin preform through the apparatus at least from a point just before the resin preform would reach its heat foaming temperature to a point where the foaming of the foamable resin preform would be substantially complete and means to move said wall means at a controlled linear speed at least as fast as and in the same direction as that of the foamed resin product in said body of liquid.

* * * * *